United States Patent
Ford et al.

(10) Patent No.: US 8,176,503 B2
(45) Date of Patent: May 8, 2012

(54) DEVICE DRIVER SELECTION

(75) Inventors: Daniel E. Ford, Granit Bay, CA (US); Jim A. Baumgartner, Roseville, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 2948 days.

(21) Appl. No.: 10/765,304

(22) Filed: Jan. 27, 2004

(65) Prior Publication Data
US 2005/0198650 A1 Sep. 8, 2005

(51) Int. Cl.
*G06F 3/00* (2006.01)
*G06F 15/173* (2006.01)
*G06F 15/177* (2006.01)

(52) U.S. Cl. .................. 719/327; 709/220; 709/223

(58) Field of Classification Search ........... 719/321–327
See application file for complete search history.

(56) References Cited

U.S. PATENT DOCUMENTS

| | | | |
|---|---|---|---|
| 6,594,890 B2 | 7/2003 | Cantwell | |
| 6,704,864 B1 * | 3/2004 | Philyaw | 713/1 |
| 7,102,765 B1 * | 9/2006 | Abi-Saleh et al. | 358/1.13 |
| 7,111,307 B1 * | 9/2006 | Wang | 719/321 |
| 2004/0003135 A1 * | 1/2004 | Moore | 709/321 |

OTHER PUBLICATIONS http://www.freebytes.com/drivers/#introduction.*

* cited by examiner

*Primary Examiner* — Joseph Avellino
*Assistant Examiner* — Jeong S Park

(57) ABSTRACT

Methods, systems, and devices are provided for device driver selection. One embodiment of a management station includes a processor, memory in communication with the processor, and program instructions stored in memory and executable on the processor. The program instructions are executable to initiate execution of a particular device function that will use a driver, select a set of drivers based upon defined device information, and call a routine in a particular driver from the selected set of drivers which executes to determine whether the particular driver is most appropriate to perform the particular device function for a particular device.

37 Claims, 3 Drawing Sheets

DEVICE DRIVER SELECTION

INTRODUCTION

Device drivers (drivers) are executable instructions used by a first device, such as a computing device, to control the operation of a second device, such as a peripheral device. A driver controls the operation of the second device by receiving a call from the operating system of the first device and executing instructions based upon the received call to direct the second device to perform a function.

A driver is written by programmers who understand the command language and characteristics of the hardware of the device to be controlled. The driver contains the executable instructions necessary for performing the function on the second device that were requested by a program application. Since devices can have different sets of functions that are controlled by a driver, drivers are generally created to control a set of functions of a particular device.

A driver can be a program routine of executable instructions that communicates between an operating system on a first device and a second device connected thereto. For example, when a new peripheral device is attached to a computing device, (e.g., a printing device attached to a personal computer), or the firmware of the device to be controlled is updated, an appropriate new device driver is often installed, in association therewith, in order to link the operating system of the computing device to the peripheral device. Executable instruction routines that perform internal functions, such as memory managers and disk caches, are also drivers and can be used in various kinds of devices including computing devices, networking devices, and peripheral devices as are described in more detail below.

Networks include a number of devices that are linked together to communicate with one another. These devices can generally be called network devices and include devices such as computing, communication, and peripheral devices, to name a few. For example, a network can include one or more computing devices, such as personal computers (PCs) (e.g., desktops and laptops), workstations, servers, and the like. A network can also include one or more communication devices such as routing devices, hub devices, and switching devices, among others. Networks can also include one or more peripheral devices such as storage devices, display devices, printing devices, scanning devices, facsimile devices, and the like.

As one can appreciate, in a network environment, many different computing, communication, and/or peripheral devices can be connected to the network allowing them to communicate with each other. Networks come in wide range of sizes and costs, from a network having a computing device and a set of peripherals, to a network having many dedicated servers, or a mainframe computer, for providing networking functions to many computers and/or to link a number of networks together. Varieties of network types have been developed and include local area networks (LANs) and wide area networks (WANs), among others.

Devices on a network do not have to be connected directly to a server in order to be part of the network, but rather, can be in communication with the network through other devices. For example, a printing device, facsimile device, and/or scanning device can be attached locally to a PC, workstation, or dedicated server and be shared by network users accessing the network through other devices connected to the network.

Devices in a network can include executable instructions to read and write data between the various devices in the network, including the network servers. Thus, data, files, and components physically on one device can be accessed by another device. In order to allow access to information on various devices, while maintaining some privacy and security, access privileges can be granted.

Each device can include executable instructions to reveal the features available on a given device. These executable instructions can be provided as firmware, software, application modules, and/or the like. The features themselves can also be provided as firmware, software, application modules, and/or the like.

Networks can include a number of management devices and/or groups of devices that are used to manage the various functions of the network. For example, networks can include a network management station that is used to manage the network's connectivity between devices. However, in some networks, a network management station can be used to manage all of the functions of the network.

Network management stations can include one or more of the above mentioned devices. For example, as explained below, network management stations can include a number of computing devices, such as servers, each controlling a different set of network functions. The network management station communicates with the devices in the network to monitor and maintain a connection between the devices. A network management station can, thereby, allow a user of a device to access data or a feature on another device connected to the network.

Networks are run and managed through the use of network-enabled operating systems. Examples of such operating systems include: Windows, Mac OS, Linux, and Unix, to name a few. Software, application modules, firmware, and other computer executable instructions also contribute to the running and management of the network.

For example, managing network communication between routers and/or other equipment in the network can be provided by various network protocols including, but not limited to, simple network management protocol (SNMP), common management information protocol (CMIP), distributed management environment (DME), and internet control message protocol (ICMP), to name a few. Additionally, data transfer between devices and servers over a network is managed by a transport protocol. Examples of transport protocols include transmission control protocol/internet protocol (TCP/IP) or inter-network packet exchange (IPX), among others.

In cases where a single driver is present for association with a particular device, the device type supported by the driver can be used to identify the appropriate driver. The type of device can be identified, for example, by a manufacturer identifier, such as make and/or model identifiers (e.g., identification numbers or codes).

However, there are several situations in which a number of drivers could be applicable to a particular make and model of device. In such situations, the manufacturer identifiers may not narrow the set of available drivers down to a single driver to be selected.

For example, devices can be purchased with identical or different features oftentimes based upon the firmware that has been provided with the device. Additionally, such devices, even if identical when purchased, can be altered to operate using different features based upon software and/or firmware updates that have been installed on the device.

For instance, new software and/or firmware can be provided to devices (e.g., installed) to update the software and/or firmware on the device and to allow new features to be enabled on the device. Thus, in some networks, a number of devices of the same make and model can be accessible through the network and although the devices are the same make and model, the devices can have different features.

Since the features of these devices are different, a different driver may be particularly suited to implement the features of each device. Therefore, a network can have several different drivers for a single make and model of device. These different drivers can include a number of current drivers that support different device features and a number of older versions of the current drivers.

Accordingly, physically choosing a driver for a particular device can be a complex physical task, especially over large networks. It is also a challenge to continually monitor and manage the numerous drivers installed on the network and to further associate the most appropriate driver to a given device.

For example, on one (e.g., a first) printing device, the focus of the device may be for tight security. To provide the tight security functionality, firmware can be provided to (e.g., loaded onto) the printing device to enable the security measures to be carried out by the printing device.

The same type of printing device can also be used to provide faster throughput through use of different firmware. In such a fast throughput device, the tight security features may not have to be implemented and/or may be a hindrance. Instead, different firmware is provided to (e.g., loaded onto) the device to achieve faster throughput. Accordingly, firmware adding the functionality of faster throughput can be provided to the printing device to enable this functionality. Therefore, although the devices can be physically identical, the firmware provided to the device can change the device's available features. Since the features of the devices are different, the driver used with the tight security printing device will be different from the driver used by the fast throughput printing device.

The tight security printing device and the fast throughput printing device can both be connected to a network and, if so, both drivers will be present on the network. As the above example illustrates, since several drivers that each support different sets of features on a device can be present on the network, a driver cannot be located only by searching the set of drivers present on the network for a particular device type, e.g., searching by make and model number. Such a search may create a short list of available drivers, but in many cases may not reduce the set down to a single driver to be selected.

Traditionally, driver selection instructions in a management server's code used a predefined set of selection criteria to choose a driver from the short list. The predefined criteria included a manufacturer identifier, such as the make of the device, a model identifier, and/or a firmware version number. This selection method, using predefined criteria, does not make use of the subtleties, as described above, between devices of the same make and model. Accordingly, in many situations, this method is not able to select one driver from the set of drivers, because the method does not differentiate between different drivers that are of the same device type.

Additionally, the most recently released driver will often be the appropriate driver for devices new added to the network. In some circumstances, however, an older driver version can be more appropriate for a device on the network. For example, a device can be added where the firmware has not been updated with particular features of another device on the network and for which the most recently released driver was designed. Therefore, although the most recent driver is appropriate for certain devices on the network, an older version of the driver, that supports another device's version of firmware, may be better suited for that particular device. In other situations, the driver can have be older than the most current driver for a particular device, but the device to be controlled has a set of features that are different from the set of features supported by the most current driver. In such a case, the most current driver may not be the most appropriate driver for controlling the device.

Another issue arises when devices are manufactured by one entity, but are sold under another company's name, (e.g., a reseller). In such cases, one reseller may want to provide a specific set of features that are different from the other resellers and/or the manufacturer, and, therefore, the reseller provides specific firmware to their devices to support such features.

Accordingly, another reseller can sell the identical device (i.e., manufactured by the same manufacturer), but may have one or more different features. In such cases, a manufacturer identifier can represent devices from a number of different resellers and, therefore, a search for drivers by manufacturer, such as by make and/or model, may not identify the correct driver or may not narrow the number of drivers to one that can be selected.

DETAILED DESCRIPTION

Embodiments of the present invention provide methods, systems, and devices to analyze a number of device drivers to determine which driver should be used with a device. Program embodiments of the present invention include embodiments having a portion of the interface for driver selection delegated to the drivers themselves, thereby allowing the drivers to be active participants in the selection of the appropriate driver for a device.

Program embodiments include instructions which execute to identify extensible criteria from the device to be controlled and/or from the driver that is being evaluated. The extensible criteria are used to narrow a set of available drivers such that one can be selected as most appropriate for use with a particular device.

In order for a device to control another device, a driver has to be associated with the device that is to be controlled. To identify a driver from a set of available drivers, additional or different information can be used to narrow the set of drivers. The information can be used as extensible criteria for determining whether a driver is appropriate for use with a particular device.

Those skilled in the art will understand that any information that can differentiate a particular driver from other drivers can be used as a criterion for determining whether a driver is appropriate. Examples of information that can be used include: information in a system descriptor string, the presence of a management information base on the device, the enablement of a feature on the device, support of a feature by the driver, and/or the existence of an identifiable bug in the executable instructions in the device, among others.

The embodiments of the present invention are not limited to specific numbers of criteria that can be used to narrow the number of available drivers. The way in which the drivers are narrowed and analyzed is not to be limited to the described examples, but rather, those skilled in the art will understand that various extensible criteria, as the same will be known and understood by one of skill in the art, can be used to narrow the number of available drivers and select an appropriate driver based on information in the drivers and execution of program instructions to further query the devices.

Figure 1:
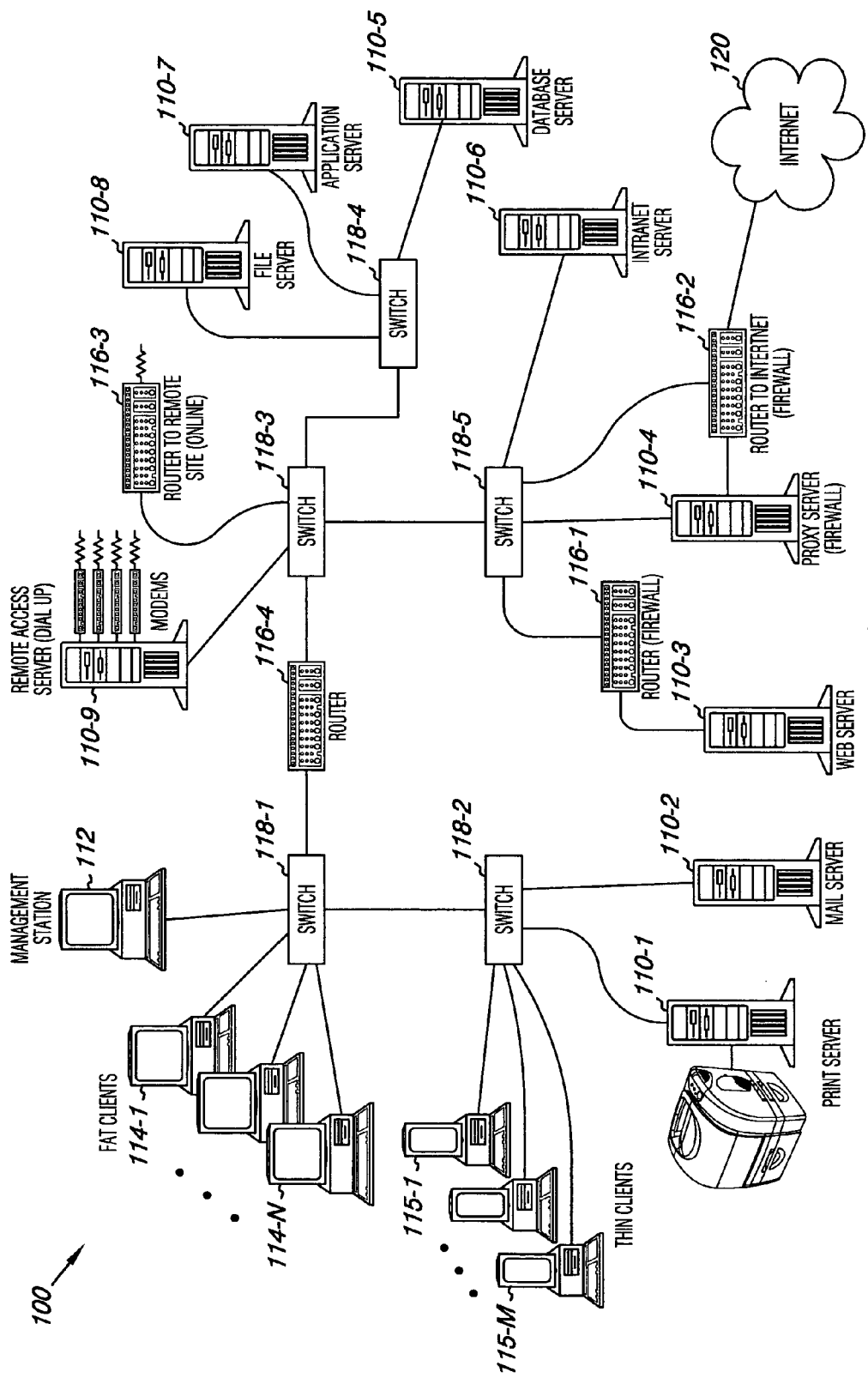
FIG. 1 is an example of a network environment.

FIG. 1 is an example of a network environment 100. As shown in FIG. 1, a number devices can be networked together via hardware components such as routers, hubs, switches, and the like. The environment of FIG. 1 illustrates computing devices including a network management server in a LAN. However, embodiments of the invention are not so limited.

The environment of FIG. 1 shows various servers used to manage a number of different functions provided by the LAN. However, in practice several functions can be managed on one device and, for large volumes, multiple devices can work together to manage a particular function to balance the traffic on the network. For example, an enterprise network can include a collection of servers, such as a server farm, cooperating to provide functionality to the network.

FIG. 1 illustrates a print server 110-1, a mail server 110-2, a web server 110-3, a proxy server (firewall) 110-4, a database server 110-5, an intranet server 110-6, an application server 110-7, a file server 110-8, and a remote access server (dial up) 110-9. Servers 110-1 to 110-9 can each be connected to a number of other devices. For example, the print server 110-1, as shown in FIG. 1, is connected to a printing device and remote access server 110-9 is shown connected to a number of modems. Additionally, the servers 110-1 to 110-9, shown in FIG. 1, are each also connected to a number of routing, switching, and computing devices. However, the invention is not limited to the number of connections shown.

The examples provided herein do not provide an exhaustive list of network components, but rather are exemplary of some devices that can be within a network environment. Additionally, the above examples and other such components can also be used as management stations for management of network functions, such as management of network connectivity, print jobs, storage devices, web access, mail service, remote access, file management, and the like.

As stated above, devices can be added to a network and instructions executed to map the new devices within the network. As the number of devices attached to the network proliferates, so too increases the number of drivers on the network. Additionally, as updates are made to the firmware in some devices, various drivers may have to be changed or updated as well.

Networks can include devices that are "thinner" than the fully-loaded Windows or Mac PC. A "thin" client device is a computer or terminal that performs little or no application processing, but rather, processes keyboard input and screen output. These, "thin" devices function like an input/output (I/O) terminal, with the application processing and data storage typically done at a server. Devices, from fully-equipped PCs to specialized terminals having limited I/O functionality, can be used as "thin" devices. In contrast, a "fat" device provides most of its application processing at the device. PCs are most often used as fat devices. The environment of FIG. 1 also illustrates a management station 112, (e.g., a PC or workstation), a number of "fat" devices 114-1 to 114-N, and a number of "thin" devices 115-1 to 115-M.

The environment of FIG. 1, illustrates that these exemplary devices, and others can be connected to one another and/or to other networks via routers, 116-1, 116-2, 116-3, and 116-4, and hubs and/or switches 118-1, 118-2, 118-3, 118-4, and 118-5, as the same are know and understood by one of ordinary skill in the art. Embodiments of the invention, however, are not limited to the number and/or quantity of devices shown in FIG. 1. The designators M and N are used to indicate that a number of fat and/or thin devices can be attached to the network 100. The number represented by M can be the same or different from the number represented by N.

As one of ordinary skill in the art will appreciate, many of these devices include processor(s) and memory hardware. Computer executable instructions, (e.g., software and/or firmware) reside in memory, such as on a management station or other device, to manage a device feature, and/or manage a network.

As stated above, when a new device is connected to a network or a device is updated, a driver has to be installed to interact with the new or updated device. Drivers can be installed in one or more locations, e.g., management stations and/or each network device. Those skilled in the art will understand that program instructions, drivers, and driver information (e.g., a database of available drivers and information about the features and/or functionalities of the drivers) can be provided in one or more locations within a distributed computing environment.

Program instructions, in a device and/or a driver, can execute to identify such information in: the driver, the device to be controlled, and/or a database on another device. Program instructions execute to analyze the identified information to select which driver is appropriate for use with the device.

The example provided below illustrates one method for determining an appropriate driver. In this example, program instructions execute to query a new device and extract the device's make and/or model identifier when the device is added or firmware of a device is updated, for example. With this information, program instructions execute to search a database of available drivers and to narrow the number of available drivers on the system by searching for drivers that support devices having the same make and model identifier.

This narrowed set of available drivers, or "short list" may include the current and older versions of drivers for a particular device type. Those skilled in the art will understand that, since different firmware can allow devices of the same device type to have different features, there can be a number of current drivers available.

However, even after having narrowed the number of available drivers down, there are several choices available for use by the set up application for the device. Program embodiments can execute instructions to choose, from among the short list of available drivers, which driver may be the most appropriately suited to a particular device based on other subtle features of the device. These features may include: that the device has had a certain set of features added to the device such as tight security or fast throughput; that the device has a firmware version that includes a bug in it; that the device has a feature enabled thereon due to a firmware update; or that a user of the device has enabled a feature on the device; to name a few.

At this point, program instructions can execute to use additional information to further narrow the set of available drivers. The information can be from the driver or information extracted from the device, or both.

For example, if the feature of fast throughput was described in the fast throughput device, then program instructions can execute to analyze which drivers support that feature. Based on that analysis, the most current driver (e.g., having the supporting the newest version of firmware for the fast throughout feature), and other drivers having fast throughput feature support would be selected from the set of available drivers. However, since there may be more than one choice among this narrowed list, program instructions can execute to continue to analyze the available drivers until a single driver is selected.

Figure 2:
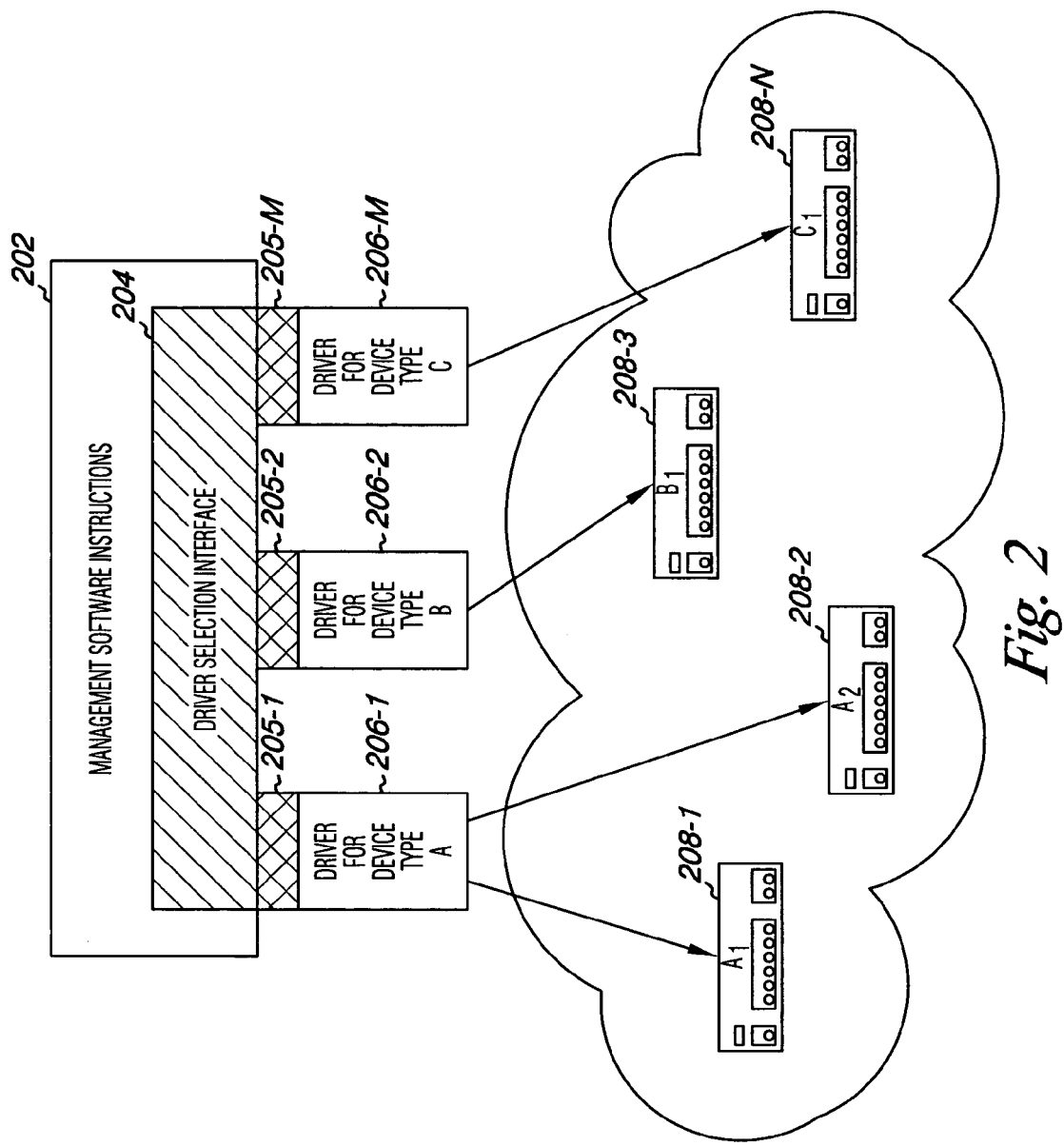
FIG. 2 is an embodiment of a driver selection interface environment.

FIG. 2 illustrates a driver selection interface environment. In the environment shown in FIG. 2, a set of management software instructions 202, driver selection interface 204, a number of drivers 206-1 to 206-M having program instructions 205-1 to 205-M, and a number of devices 208-1 to 208-N, are provided. The designators M and N are used to indicate that a number of program instructions, drivers, and devices can be attached to the network 200. The number represented by M can be the same or different from the number represented by N.

FIG. 2 illustrates an embodiment where a portion of the driver selection interface 204 is provided within the management software instructions 202. For example, the management software instructions 202 can include executable instructions for driver selection which execute to select a set of drivers based on defined driver information, such as manufacturer identifiers. These executable instructions can narrow the number of available drivers to those that are relevant to a manufacturer, model, and/or device having a particular firmware version when installed.

Additionally, the embodiment shown in FIG. 2 illustrates that program instructions are provided to the drivers 206-1 to 206-M. Thus, drivers 206-1 to 206-M include executable instructions (e.g., illustrated as 205-1 to 205-M and located within each driver 206-1 to 206-M) that can interrogate a particular device, such as 208-1, to be controlled to identify criteria that can be used to narrow the number of available drivers 206-1 to 206-M and select an appropriate driver, such as 206-1, for use with the particular device 208-1.

For example, managing a network can include a program application employing executable instructions to call a routine in a device connected to the network to identify information regarding the device and to extract information about the features of the device. Program instructions can be in the form of a network polling program application.

The identified information from the device can be used in addition to or instead of the manufacturer information. For example, the manufacturer information can be used to narrow a list of available drivers down to a short list of available drivers that are usable with a particular device type. The information identified from the device and/or driver can be used to further narrow the short list. The information identified from the device and/or driver can also be used to narrow the full list of available drivers.

Those skilled in the art will understand that the program embodiments can execute to identify more than one feature on the device and can identify more than one driver suited to certain ones of those features. For instance, in some cases, a driver is identified that supports one feature enabled on a device, but does not support other features that are enabled on the device.

The available drivers, such as 206-1 to 206-M, can be searched based upon whether a driver, such as 206-1, has each of the identified features. Each driver, e.g., 206-1, can then be compared to the others 206-2 to 206-M, for example, based upon which driver supports the most features or which driver supports one or more particular features.

For instance, the search for an appropriate driver may have been started because a particular device function has to be initiated. Accordingly, a driver, such as driver 206-1, that supports this particular device function has to be associated with the device, e.g., 208-1, in order to execute the particular device function. The drivers 206-1 to 206-M can be searched to identify a driver that supports all of the functions of the device or to identify a driver that will support the particular device function to be initiated.

Program instructions can execute to identify other criteria, such as other device features, that are used in the analysis of selecting the proper driver. For instance, if a device, such as 208-1, has the features of fast throughput and a unique security protocol enabled, but the driver, e.g., 206-2, being analyzed supports features of fast throughput and user enabled options, but does not support the security protocol feature, program instructions can execute to continue to analyze the set of drivers 206-1 to 206-M to identify a driver that supports both the features of fast throughput and the security protocol, e.g., 206-1.

In some situations, a driver supporting all of the features of a device may not be available on the network. In such cases, program instructions can execute to determine the closest comparison between the driver and device features based upon the analysis of the device features and features supported by the driver. Program instructions for accomplishing this analysis can be within one or more of the drivers, or can be within the management software instructions. Locating the program instructions in one or more of the drivers, for accomplishing the analysis determining the most appropriate driver, allows the management software to remain agnostic with respect to the particularities of the different drivers and devices.

Another criterion that can be used to narrow the list of available drivers is the release date of a driver. For example, the driver, supporting a fast throughput feature that has the most recent release date, is the most current version of a driver for fast throughput enabled devices. Program instructions can, therefore, execute to sort the available drivers by release date and execute to begin analyzing the drivers by the most recent release date. In this way, the most recently released driver, supporting the fast throughput feature of the device to be driven, will be selected.

FIG. 2 also illustrates situations in which a driver is used to control a particular device (i.e., driver 206-2 and device 208-3). FIG. 2 also illustrates a situation where a driver is used to control a number of devices (i.e., driver 206-1 and devices 208-1 and 208-2). This illustration shows that there can be several devices on a network that can use the same driver, if the driver is determined to be appropriate for each of the devices and that there may be a single driver which is most appropriate for a particular device.

Figure 3:
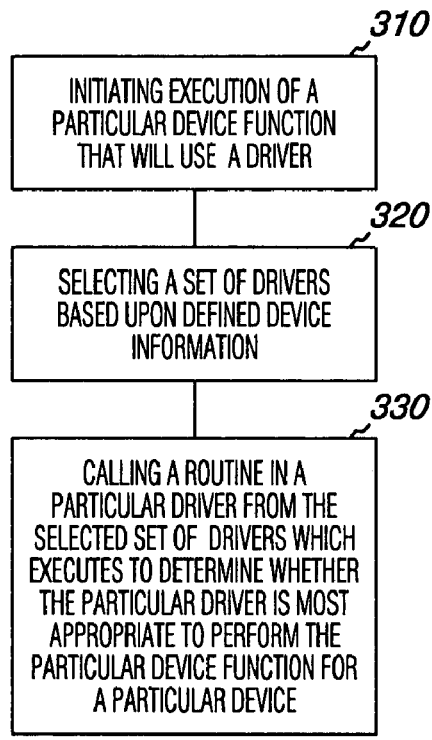
FIG. 3 illustrates a method embodiment of analyzing a driver for use with a device.
Figure 4:
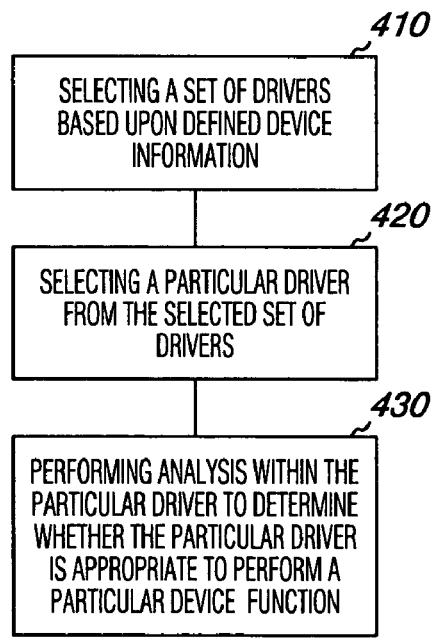
FIG. 4 illustrates another method embodiment of analyzing a driver for use with a device.

FIGS. 3 and 4 illustrate various method embodiments to select a device driver. As one of ordinary skill in the art will understand, the embodiments can be performed by computer executable instructions operable on the systems and devices shown herein or otherwise. The invention, however, is not limited to a particular operating environment or to software written in a particular programming language. Computer executable instructions, including software, program applications, and/or application modules, suitable for carrying out embodiments of the present invention, can be resident in one or more devices or locations or in several and even many locations.

Unless explicitly stated, the method embodiments described herein are not constrained to a particular order or sequence. Additionally, some of the described method embodiments can occur or be performed at the same point in time.

FIG. 3 illustrates a method embodiment 300 of selecting a driver for a device. As explained in connection with FIG. 1, program instructions execute to initiate execution of a particular device function that will use a driver, as shown in block 310. For example, program instructions can execute to perform a tight security function with respect to a particular device. When these instructions initiate the execution of the function, the instructions have to use a driver to carry out the function on the device. Accordingly, a driver has to be selected from among the set of available drivers.

In block 320, the method of FIG. 3, includes selecting a set of drivers based upon defined device information. The defined device information includes, information such as a manufacturer identifier, including the make and/or model, and/or the firmware version as of the date the device was setup, among others. In various embodiments, the initiation and selection functions are provided within management software, such as on a network management station or on a storage device management station, among other locations.

The method also includes calling a routine in a particular driver from the selected set of drivers which executes to determine whether the particular driver is most appropriate to perform the particular device function for a particular device at block 330. The particular driver can provide a response by providing information to be used in further analysis of the set of drivers. The particular driver can also provide a response by analyzing whether a driver is appropriate and returning the result of the analysis. As mentioned above, the routine can execute to analyze information such as device make and model, device release date, features enabled, software version number, existence of a bug in the program instructions, and/or firmware version, among other information.

The determination of a particular driver can be accomplished by searching each driver within the set of drivers to identify a particular driver that supports a particular set of device features. As stated above, the set of device features can also be compared against sets of supported device features for a number of drivers within the set of drivers to determine an appropriate driver. Set of device features can include any number of features and the set need not be all of the features available on the device. For example, the set of device features can be those that are to be used in executing the particular device function that has been initiated.

In various embodiments, information from a device regarding what version of firmware the device is using can be extracted. The compatibility of the driver with a particular firmware version can be provided by the driver. This firmware information can be used in the selection of the particular driver for use with the device based upon the device firmware version and firmware version compatibility of the particular driver.

The determination of a driver can be aided by organization of the drivers. For example, the drivers can be organized based on a hierarchy structure. In various embodiments, the hierarchy of drivers can be organized by release date, or firmware version that is support by the driver, or a driver version identifier.

The set of available drivers can also be organized by a release date of each driver and can then be searched from newest release date to oldest release date. From this organization a driver can be selected for example, from among the hierarchy based on comparison of whether a feature of a device is supported by a particular driver.

FIG. 4 illustrates another method embodiment 400 of selecting a driver for a device. As illustrated with respect to the embodiment of FIG. 1, the method can include selecting a set of drivers based upon defined device information at block 410.

The method of FIG. 4 also includes selecting a particular driver from the selected set of drivers at block 420. At block 430, the method also includes performing analysis within the particular driver to determine whether the particular driver is appropriate to perform a particular device function.

As stated above, the selection of whether a driver is appropriate to perform a particular device function can be determined based upon identification of one or more extensible criteria. The selection can also be accomplished by comparison of a set of device features of a particular device and a set of device features supported by a driver.

In various embodiments, the sets of device features supported by a driver can be compared to each other with respect to the set of device features of the particular device. The sets of device features supported can also be compared one at a time with the set of device features. For example, if the drivers are organized in a hierarchy based upon date of the firmware version on the device that is supported by the driver, program instructions can execute to compare each driver independently to the set of device features from the newest firmware version date to the oldest firmware version date or vice versa.

Although specific embodiments have been illustrated and described herein, those of ordinary skill in the art will appreciate that any arrangement calculated to achieve the same techniques can be substituted for the specific embodiments shown. This disclosure is intended to cover adaptations or variations of various embodiments of the invention. It is to be understood that the above description has been made in an illustrative fashion, and not a restrictive one.

Combination of the above embodiments, and other embodiments not specifically described herein will be apparent to those of skill in the art upon reviewing the above description. The scope of the various embodiments of the invention includes various other applications in which the above structures and methods are used. Therefore, the scope of various embodiments of the invention should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the embodiments of the invention require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A management station, comprising:
   a processor;
   memory in communication with the processor; and
   program instructions stored in the memory and executable on the processor to:
      initiate execution of a particular device function that will use a driver;
      select a set of drivers based upon defined device information; and
      call a routine in a particular driver from the selected set of drivers which executes to determine whether the particular driver is most appropriate to perform the particular device function for a particular device.

2. The management station of claim 1, further including program instructions which execute to select the particular driver to perform the particular device function based upon a response from the routine.

3. The management station of claim 1, wherein the program instructions, to initiate the execution of the particular device function and select the set of drivers, are provided within management software and wherein the program instructions to determine whether the particular driver is appropriate are provided within a particular driver.

4. The management station of claim 1, wherein the program instructions to determine whether the particular driver is appropriate execute to compare a device identifier with a driver identifier.

5. The management station of claim 4, wherein the device identifier is a system descriptor string.

6. The management station of claim 4, wherein the device identifier is a feature enabled on the particular device.

7. The management station of claim 4, wherein the device identifier is a management information base on the particular device.

8. The management station of claim 4, wherein the device identifier is an identifiable bug in a set of executable instructions of the particular device.

9. A management station, comprising:
a processor;
memory in communication with the processor; and
a management application having program instructions stored in the memory and executable on the processor to:
select a set of drivers based upon defined device information;
select a particular driver from the selected set of drivers; and
the particular driver having program instructions stored in memory and executable on the processor to:
perform analysis to determine whether the particular driver is appropriate to perform a particular device function.

10. The management station of claim 9, further including program instructions within the particular driver which execute to initiate a determination of whether the particular driver is appropriate to perform the particular device function.

11. The management station of claim 9, wherein the particular driver includes a set of extensible criteria used to determine whether the particular driver is appropriate.

12. The management station of claim 9, further including program instructions within the particular driver which execute to query a particular device for a firmware version identifier.

13. The management station of claim 9, wherein the selection of a particular driver from the selected set of drivers is based upon a release date of the particular driver.

14. The management station of claim 9, wherein the selection of a particular driver from the selected set of drivers is based upon a device feature supported by the particular driver.

15. The management station of claim 9, wherein the supported device feature is a security protocol.

16. A method of selecting a driver for a device, comprising:
initiating execution of a particular device function that will use a driver;
selecting a set of drivers based upon defined device information; and
calling a routine in a particular driver from the selected set of drivers which executes to determine whether the particular driver is most appropriate to perform the particular device function for a particular device.

17. The method of claim 16, wherein the routine executes if a driver cannot be determined based on the defined device information.

18. The method of claim 16, wherein initiating the execution of the particular device function and selecting the set of drivers are provided by program instructions within network management software and wherein determining whether the particular driver is appropriate is provided by program instructions within the particular driver.

19. The method of claim 16, wherein initiating the execution of the particular device function and selecting the set of drivers are provided by program instructions within storage device management software and wherein determining whether the particular driver is appropriate is provided by program instructions within a particular driver.

20. The method of claim 16, further including searching each driver within the set of drivers to identify a particular driver that supports a particular set of device features.

21. The method of claim 16, further including organizing the set of drivers by a release date of each driver.

22. The method of claim 21, further including searching the set of drivers from newest release date to oldest release date.

23. The method of claim 16, further including comparing the set of device features against sets of device features supported by a number of available drivers within the set of drivers.

24. A method of selecting a driver for a device, comprising:
selecting a set of drivers based upon defined device information;
selecting a particular driver from the selected set of drivers; and
performing analysis within the particular driver to determine whether the particular driver is appropriate to perform a particular device function.

25. The method of claim 24, further including organizing the drivers within the set of drivers based on a hierarchy.

26. The method of claim 25, further including organizing the hierarchy based on a driver version identifier.

27. The method of claim 25, further including organizing the hierarchy based on a driver release date.

28. The method of claim 25, further including selecting an appropriate driver from among the hierarchy based on comparison of whether a feature of the particular device is supported by the particular driver.

29. A computer readable storage medium having program instructions that are executed by a computing device to cause a device to perform a method, comprising:
initiating execution of a particular device function that will use a driver;
selecting a set of drivers based upon defined device information; and
calling a routine in a particular driver from the selected set of drivers which executes to determine whether the particular driver is most appropriate to perform the particular device function for a particular device.

30. The computer readable storage medium of claim 29, further including determining which driver includes support for functions that most closely correlates to a set of device functions.

31. The computer readable storage medium of claim 29, further including extracting information from the particular device regarding what version of firmware the particular device is using.

32. The computer readable storage medium of claim 31, further including selecting the particular driver for use with the particular device based upon the device firmware version and firmware version compatibility of the particular driver.

33. A management station, comprising:
a processor;
memory in communication with the processor; and
means for automatically selecting, from among a number of drivers, a particular driver having features which most closely correlates to a set of device features of a device, where a routine is called in the particular driver which executes to determine a correlation of the particular driver to the set of device features of a device.

34. The management station of claim 33, wherein at least a portion of the means for automatically selecting is delegated to program instructions within the particular driver.

35. The management station of claim 33, wherein the means for automatically selecting a driver includes program instructions within each driver which execute to narrow a list of available drivers.

36. The management station of claim 33, wherein the means for automatically selecting a driver includes program instructions within a particular driver which execute to determine whether the particular driver is appropriate for use with the device.

37. The management station of claim 36, wherein the program instructions within a particular driver includes program instructions which execute to analyze the set of device features against a set of driver features to determine whether the particular driver is appropriate for use with the particular device.

* * * * *